Nov. 11, 1952 W. H. DAVIES 2,617,201
PLUG GAUGE
Filed June 9, 1949

INVENTOR.
William H. Davies.
BY
W. B. Harpman
ATTORNEY.

Patented Nov. 11, 1952

2,617,201

UNITED STATES PATENT OFFICE 2,617,201

PLUG GAUGE

William H. Davies, Ellwood City, Pa.

Application June 9, 1949, Serial No. 97,971

3 Claims. (Cl. 33—178)

This invention relates to a plug gauge and more particularly to a plug gauge for determining the inner diameter of a tubular object.

The principal object of the invention is the provision of an improved plug gauge for determining the inner diameter of a tubular object.

A further object of the invention is the provision of a plug gauge of lightweight, multiple unit construction enabling a workman to handle the device easily and thereby speeding up the gauging operation.

A still further object of the invention is the provision of a plug gauge of multiple unit construction providing in one tool a plurality of sections which may be removed and used independently.

A still further object of the invention is the provision of a plug gauge of multiple unit construction having means for holding the multiple units in removably affixed end-to-end relation.

A still further object of the invention is the provision of a lightweight multiple unit plug gauge having hard metal wearing surfaces.

The plug gauge shown and described herein comprises a plug gauge for determining inner diameters of objects such as steel tubes and the like. It has heretofore been customary in the art to utilize cast steel plug gauges which are heavy and cumbersome and require the lifting and insertion of the entire gauge in order to determine the inner diameter of the tubular object being gauged.

The present invention relates to a lightweight multiple part plug gauge made, for example, in three parts of lightweight aluminum alloy or the like, each of the parts being removably affixed to the other so that in their entirety a plug gauge of conventional size and shape is formed. A removably affixed handle is also employed which may be used for handling the multiple part assembly or any one of the parts thereof, as desired.

The multiple part plug gauge will be seen to make it possible for a number of workmen to utilize the various parts of the gauge in gauging a number of tubular objects at one and the same time and each of which is in a slightly different size range than the other. One of the plug gauges thereby is capable of replacing a number of the conventional heavy integrally formed cast steel plug gauges as heretofore known in the art.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein.

Figure 1:
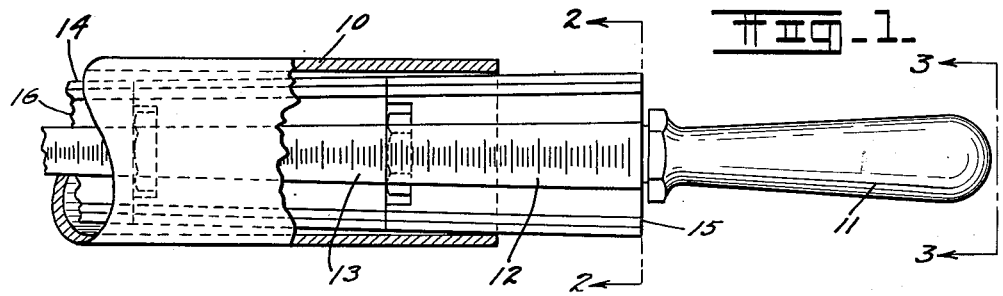
Figure 1 is a side elevation of a tubular member showing a plug gauge inserted therein.
Figure 2:
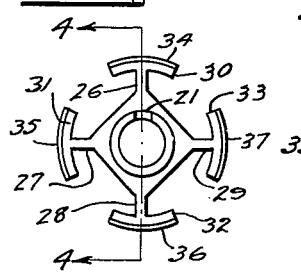
Figure 2 is a vertical section taken on line 2—2 of Figure 1.
Figure 3:
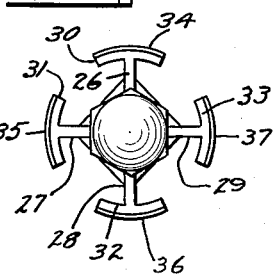
Figure 3 is an end view taken on line 3—3 of Figure 1.

By referring to the drawings and Figure 1 in particular it will be seen that a tubular object such as a pipe is disclosed and indicated by the numeral 10 and has a plug gauge positioned partially therein for determining the inner diameter thereof. The plug gauge consists of a handle 11 and a plurality of detachably connected gauge sections 12, 13 and 14, respectively. The plurality of gauge sections 12, 13 and 14, when assembled in end-to-end relation as shown in Figure 1 of the drawings, form a plug gauge of conventional size and shape, for example, one wherein the greatest diameter is two inches and the smallest diameter one inch, and the longitudinal surfaces thereof are tapered from the greater to the lesser dimension. In Figure 1 of the drawings the largest dimension is at the end indicated by the numeral 15, and the smallest at the end indicated by the numeral 16. Each of the three gauge sections 12, 13 and 14 tapers progressively from right to left, as illustrated, and may be obviously formed in different dimensions from those hereinbefore set forth and in accordance with plug gauge practice. The number of plug gauge sections may also vary from the three illustrated herein as will occur to those skilled in the art.

The handle 11 is provided with an extension 17 and a collar 18 separates the handle 11 therefrom. The extension 17 is provided with a pin 19 and the extension 17 is adapted to engage a tubular socket formed in the right end of each of the plug gauge sections 12, 13 and 14, respectively, and as best illustrated in enlarged detail in Figures 4 and 6 of the drawings.

Each of the plug gauge sections 12, 13 and 14 is formed about a tubular core 20, one end of which is provided with a bayonet slot 21 so that the pin 19 in the extension 17 of the handle 11 will register therewith.

Figure 4:
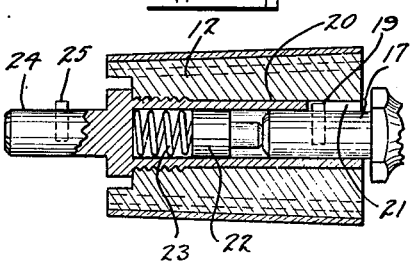
Figure 4 is a vertical section taken on line 4—4 of Figure 2.
Figure 5:
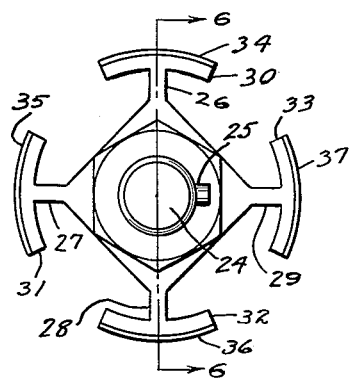
Figure 5 is an enlarged end view of the device shown in Figure 1, as taken on line 5—5 of Figure 6.

Means for tensioning the extension 17 on the handle 11 is provided and comprises a plunger 22 and a spring 23 normally urging the same to the right, as shown in Figure 4 of the drawings. It will thus be seen that when the handle 11 is applied to the plug gauge section 12, the pin 19 locks in the bayonet slot 21 thereby firmly affixing the handle 11 to the plug gauge section 12. The tubular core 20 has an extension 24 thereon provided with a pin 25 which is formed exactly the same as the extension 17 in the handle so that the plug gauge section 12 may be affixed thereby to the plug gauge section 13. A similar construction exists on the plug gauge 13 for connection with the plug gauge 14. Alternately, the handle 11 may be engaged directly upon the plug gauge section 13 or 14, as desired, as it will be observed that the locking devices are identical despite the different outer diameters of the respective plug gauge sections 12, 13 and 14.

Figure 6:
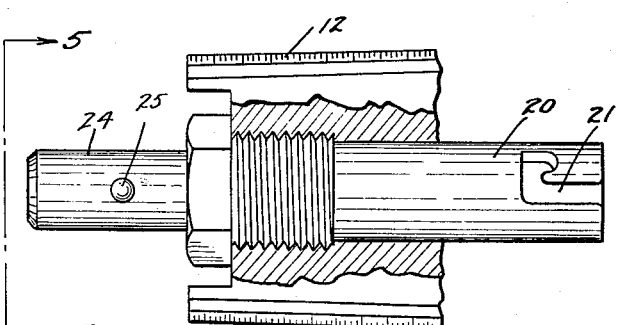
Figure 6 is a section taken on line 6—6 of Figure 5.
Figure 7:
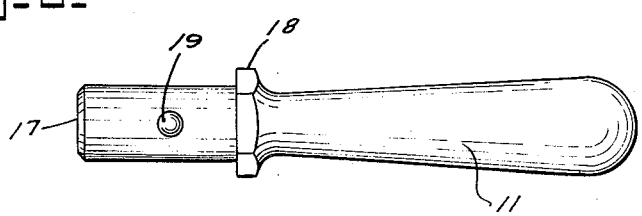
Figure 7 is a detailed view of the handle shown in Figure 1.

Each of the plug gauge sections 12, 13 and 14 has a cross-sectionally square, ribbed pattern, the ribs of which are indicated by the numerals 26, 27, 28 and 29 and each of which ribs has a modified T-headed outermost end section 30, 31, 32 and 33. Each of the modified T-headed sections 30, 31, 32 and 33 is provided with an overlying replaceable layer of hardened metal 34, 35, 36 and 37, respectively. The modified T-headed sections 30, 31, 32, and 33 run longitudinally of the plug gauge sections and terminate in end-to-end relation and are provided with suitable calibrations, as best illustrated in figures 1 and 6 of the drawings.

It will thus be seen that when the several gauge sections of the plug gauge are assembled one to another by the means hereinbefore disclosed and the handle 11 affixed thereto, a complete plug gauge is formed of a size and shape comparable with that heretofore known in the art but of considerably lighter weight and capable of being taken apart and the individual parts thereof utilized for a number of simultaneously performed gauging operations.

It will occur to those skilled in the art that various types of interlocking means may be employed between the different plug gauge sections without departing from the spirit of the invention.

Having thus described my invention, what I claim is:

1. A plug gauge comprising a plurality of longitudinally tapered plug gauge sections each of which is X-shaped in cross section and each of which has a projecting portion on one end and tensioning and locking means formed within the opposite portion thereof for removable engagement with a projecting portion of the adjacent section, at least one handle member engageable in any one of the said plug gauge sections whereby the said plug gauge and any one of the sections thereof may be used for individually gauging the inner diameter of a tubular object, said tensioning means comprising a plunger and a spring for engaging said projecting portion of said adjacent section when the same is in engagement in said locking means.

2. A plug gauge comprising at least a pair of different sized longitudinally tapered plug gauge sections having spring tensioned detachable inter-engaging means therebetween for holding the same in end-to-end alignment, and a handle detachably connected to the largest end of the largest one of the plug gauge sections and removable therefrom for engagement with the largest end of the other of the said plug gauge sections.

3. A plug gauge comprising a plurality of longitudinally tapered plug gauge sections, each of which is X-shaped in cross section and has wear resisting longitudinally extending strips on the outermost ends of the said X-shaped sections, each of the said plug gauge sections having a slotted tubular member centrally thereof and disposed longitudinally thereof and in one end thereof, and each of the said slotted tubular members having an axial extension of a size for registry with the said slotted tubular member of the adjacent plug gauge section and pin means in said extensions for engaging the slots in said slotted tubular members and a spring in each of said tubular members whereby the several sections may be detachably secured to one another under tension, and a handle for engaging the outermost end of the assembled plug gauge sections.

WILLIAM H. DAVIES.

REFERENCES CITED

The following references are of record in the file of this patent:

UNITED STATES PATENTS

| Number | Name | Date |
|---|---|---|
| 28,694 | Smith | June 12, 1860 |
| 146,974 | Allen | Feb. 3, 1874 |
| 920,188 | Schumacher | May 4, 1909 |
| 1,003,626 | Malcolm | Sept. 19, 1911 |
| 1,350,311 | Hoagland | Aug. 24, 1920 |
| 1,721,600 | Leschen | July 23, 1929 |
| 1,921,522 | Hamer | Aug. 8, 1933 |
| 2,075,024 | Delano | Mar. 30, 1937 |
| 2,298,597 | Sexton | Oct. 13, 1942 |
| 2,470,254 | Lee | May 17, 1949 |

FOREIGN PATENTS

| Number | Country | Date |
|---|---|---|
| 80,247 | Switzerland | Feb. 17, 1919 |
| 539,463 | Great Britain | Sept. 11, 1941 |
| 555,905 | Great Britain | Sept. 13, 1943 |
| 904,509 | France | Nov. 8, 1945 |